United States Patent
Kuchi et al.

(10) Patent No.: US 9,722,712 B2
(45) Date of Patent: Aug. 1, 2017

(54) INTERFERENCE MANAGEMENT FOR A DISTRIBUTED SPATIAL NETWORK

(75) Inventors: Kiran Kumar Kuchi, Hyderabad (IN); Bhaskar Ramamurthi, Chennai (IN); Jeniston Deviraj Klutto Milleth, Chennai (IN); Sivakishore Reddy Yerrapareddy, Kadappah (IN); Sunil Kaimalettu, Chennai (IN); Naga Sekhar Suruvu, Dharmavaram (IN); Dhivagar Baskaran, Chennai (IN); Giridhar Krishnamurthi, Chennai (IN); Padmanabhan Madampu Suryasarman, Linz (AT)

(73) Assignee: Centre of Excellence in Wireless Technology, Chennai, TN (IN)

( * ) Notice: Subject to any disclaimer, the term of this patent is extended or adjusted under 35 U.S.C. 154(b) by 746 days.

(21) Appl. No.: 14/116,341

(22) PCT Filed: May 9, 2012

(86) PCT No.: PCT/IN2012/000339
§ 371 (c)(1),
(2), (4) Date: Feb. 12, 2014

(87) PCT Pub. No.: WO2012/153352
PCT Pub. Date: Nov. 15, 2012

(65) Prior Publication Data
US 2016/0173208 A1     Jun. 16, 2016

(30) Foreign Application Priority Data

May 9, 2011   (IN) ........................... 1610/CHE/2011
Jan. 19, 2012  (IN) ........................... 229/CHE/2012

(51) Int. Cl.
*H04B 7/06*     (2006.01)
*H04B 15/00*    (2006.01)
(Continued)

(52) U.S. Cl.
CPC ........... *H04B 15/00* (2013.01); *H04B 7/0619* (2013.01); *H04W 72/085* (2013.01); *H04W 88/085* (2013.01)

(58) Field of Classification Search
CPC ... H04B 15/00; H04B 7/0619; H04W 88/085; H04W 72/085
See application file for complete search history.

(56) References Cited

U.S. PATENT DOCUMENTS

| | | | |
|---|---|---|---|
| 2003/0109283 A1* | 6/2003 | Shapira | H01Q 1/246 455/561 |
| 2008/0150514 A1* | 6/2008 | Codreanu | H04B 17/21 324/76.77 |

(Continued)

FOREIGN PATENT DOCUMENTS

WO     2011019962 A2    2/2011

OTHER PUBLICATIONS

PCT/JP2010/055144 by Ng.*
(Continued)

*Primary Examiner* — Siu Lee

(57) ABSTRACT

A communication network comprising of at least one remote base station; and a plurality of antenna ports connected to the at least one remote base station; wherein the remote base station controls the plurality of antenna ports. The remote base station is configured for defining mutually exclusive entry and exit points for the antenna ports in at least one of time; or frequency. Also, disclosed herein is a communication network comprising of at least one network controller and at least one base station, wherein the network controller is configured for assigning entry and exit points for each base station.

52 Claims, 7 Drawing Sheets

(51) Int. Cl.
*H04W 72/08* (2009.01)
*H04W 88/08* (2009.01)

(56) References Cited

U.S. PATENT DOCUMENTS

| | | | | |
|---|---|---|---|---|
| 2009/0005096 A1* | 1/2009 | Scheinert | H04B 7/0874 | 455/513 |
| 2009/0316662 A1* | 12/2009 | Yagihashi | H04L 1/0026 | 370/335 |
| 2010/0060522 A1* | 3/2010 | Backlund | H01Q 1/246 | 342/372 |
| 2010/0062783 A1* | 3/2010 | Luo | H04J 11/0069 | 455/450 |
| 2010/0075706 A1* | 3/2010 | Montojo | H04B 7/061 | 455/513 |
| 2010/0099451 A1* | 4/2010 | Saban | H04W 4/20 | 455/502 |
| 2010/0166098 A1* | 7/2010 | Luz | H04B 7/0413 | 375/267 |
| 2010/0195614 A1* | 8/2010 | Nimbalker | H04W 72/1289 | 370/330 |
| 2010/0285823 A1* | 11/2010 | Karaoguz | H04W 72/0453 | 455/509 |
| 2011/0002410 A1 | 1/2011 | Forenza et al. | | |
| 2011/0098046 A1* | 4/2011 | Shin | H04W 48/16 | 455/436 |
| 2011/0317748 A1* | 12/2011 | Li | H04B 7/0417 | 375/219 |
| 2012/0008522 A1* | 1/2012 | Ng | H04L 1/0026 | 370/252 |
| 2012/0021693 A1* | 1/2012 | Wintzell | H04B 7/0871 | 455/67.11 |
| 2012/0076236 A1* | 3/2012 | Ko | H04B 7/0486 | 375/296 |
| 2012/0147831 A1* | 6/2012 | Golitschek | H04L 1/0026 | 370/329 |
| 2012/0213113 A1* | 8/2012 | Zhao | H04B 7/0626 | 370/252 |
| 2012/0220333 A1* | 8/2012 | Zhu | H04B 7/061 | 455/525 |
| 2012/0287875 A1* | 11/2012 | Kim | H04W 76/046 | 370/329 |

OTHER PUBLICATIONS

PCT/KR2011/001833 by Kim.*
PCT/EP2010/004722 by Golitschek.*
PCT/EP2009/063905 by Wintzell.*

* cited by examiner

INTERFERENCE MANAGEMENT FOR A DISTRIBUTED SPATIAL NETWORK

PRIORITY DETAILS

The present application is a National Phase Application for PCT application No. PCT/IN2012/000339 based on and claims priority from IN Applications bearing No. 1610/CHE/2011 and 229/CHE/2012 Filed on 9 May 2011 and 19 Jan. 2012 respectively, the disclosure of which is hereby incorporated by reference herein.

FIELD OF EMBODIMENT

This embodiment relates to communication networks and more particularly to architecture for communication networks and managing the same (and also in existing communication networks).

BACKGROUND OF EMBODIMENT

Channel Quality Indicator (CQI) is a parameter that is measured at the user equipment (UE) based on the received signals for specific frequency bands of interest in the downlink (DL). The CQI is reported back to the eNB or a BS in general using a fast feedback channel in the uplink (UL). The BS uses this CQI information to choose the appropriate modulation and coding rate (MCS) for an UE, and allocates resources to it in the subsequent frames. Since the CQI is measured in a frame and resources are allocated based on this CQI information in the subsequent frames, it is important for the CQI to be stable and remain valid in the frame in which the UE is scheduled. In a conventional system where reference signals are always transmitted independent of the presence of data, the CQI measured at the receiver reflects the worst-case CQI. On the other hand if the reference signals are transmitted along with data, the CQI fluctuates in time due to traffic variations.

SUMMARY OF EMBODIMENT

Embodiments herein disclose a communication network comprising of at least one remote base station; and a plurality of antenna ports connected to the at least one remote base station; wherein the remote base station controls the plurality of antenna ports. The remote base station is configured for defining entry and exit points for each selected antenna port in at least one of time; or frequency.

Also, disclosed herein is a communication network comprising of at least one network controller and at least one base station, wherein the network controller is configured for assigning entry and exit points for each base station.

Disclosed herein is a remote base station in a communication network comprising of at least one means configured for controlling a plurality of antenna ports, wherein the plurality of antenna ports are connected to the remote base station and the base station is configured for defining entry and exit points for each selected antenna port in at least one of time; or frequency.

Disclosed herein is a network controller in a communication network, the communication network further comprising of at least one base station, wherein the network controller is configured for assigning entry and exit points for each base station.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

The embodiments herein will be better understood from the following detailed description with reference to the drawings, in which.

DETAILED DESCRIPTION OF EMBODIMENT

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
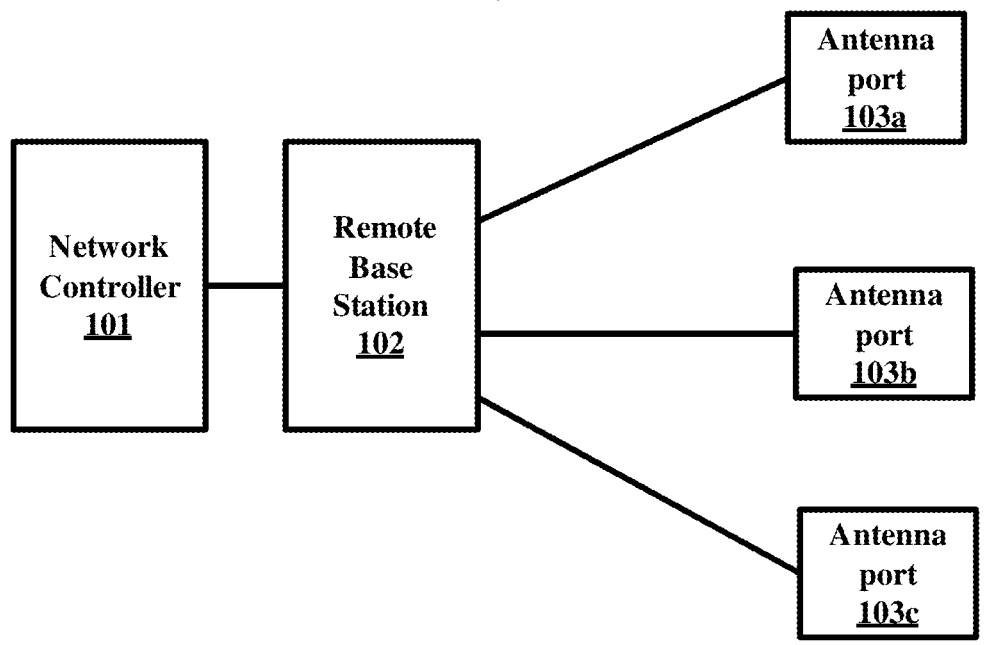
FIG. 1 illustrates a communication network according to the embodiments disclosed herein.

FIG. 1 illustrates a communication network, according to embodiments disclosed herein. The communication network as depicted in FIG. 1 comprises of a Network controller 101, a remote Base station (BS) 102 and a plurality of antenna ports 103a, 103b and 103c. The network controller 101 controls the functioning of the remote BS 102 and may be connected to more than one remote BS 102. The controller 101 may be further connected to other equipment necessary for the functioning of the network. The remote BS 102 is connected to the controller 101 and to the plurality of antenna ports 103. The antenna ports 103 may be co-located with the remote BS 102. Alternatively, the antenna ports 103 may be present remotely from the remote BS 102 and connected to the remote BS 102 using a suitable means such as wired (optical fibre, coaxial cable, ethernet etc.), wireless (microwave links, relays etc) and so on. In yet another embodiment, at least two or more of the antenna ports 103 may be co-located. The antenna ports 103 may also be located at remote locations. The remote BS 102 comprises means for controlling the functioning of the antenna ports 103 connected to it. The antenna ports 103 are mere receive and forward ports, where the antenna ports 103 receive signals from the remote BS 102 and forwards the signals to a destination UE. The antenna ports 103 may receive signals from an originating UE and forwards the signals to the remote BS 102.

Figure 2:
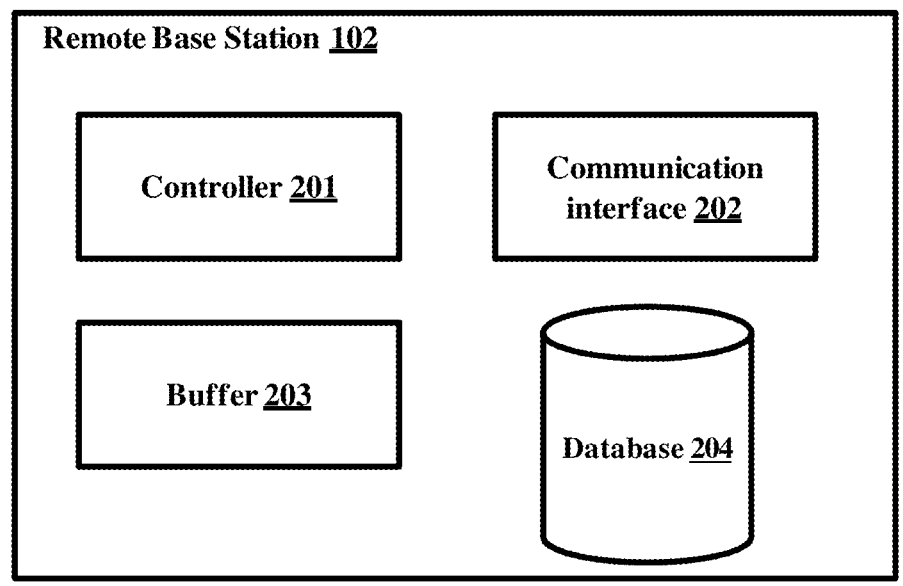
FIG. 2 depicts a remote BS, according to embodiments as disclosed herein.

FIG. 2 depicts a remote BS, according to embodiments as disclosed herein. The remote BS 102 comprises of a controller 201, a communication interface 202, a buffer 203 and a database 204.

The controller 201 defines entry and exit points for communication for each antenna port 103 depending on factors comprising of factors such as, channel conditions, location of the destination user, traffic conditions and so on. The controller 201 may define the entry and exit points in terms of frequency (RBGS/sub-band) and/or time (frame/sub-frame) resource units, where the RBGS/sub-band/frame/sub-frame may be contiguous or distributed. The entry and exit points may be mutually exclusive among antenna ports.

The controller 201 forms groups from the antenna ports 103. The groups may have any number of antenna ports 103 present within it. The controller 201 further assigns a BS Identification (BSID) to each group, with each antenna port present in each group also being assigned a unique identification number.

The controller 201 defines entry and exit points for communication for each antenna port 103 depending on factors comprising of factors such as, channel conditions, location of the destination user, traffic conditions and so on. The controller 201 may define the entry and exit points in terms of frequency (RBGS/sub-band) and/or time (frame/sub-frame), where the RBGS/sub-band/frame/sub-frame may be contiguous or distributed. The entry and exit points may be mutually exclusive.

The controller 201 may request antenna ports and/or groups of antenna ports to provide CQI between the entry points and exit points. The CQI may be provided at pre-defined periodic intervals and/or on the controller 201 sending a request.

The controller 201 sends the communication related information to the respective antenna port 103 via the communication interface 202.

Figure 3:
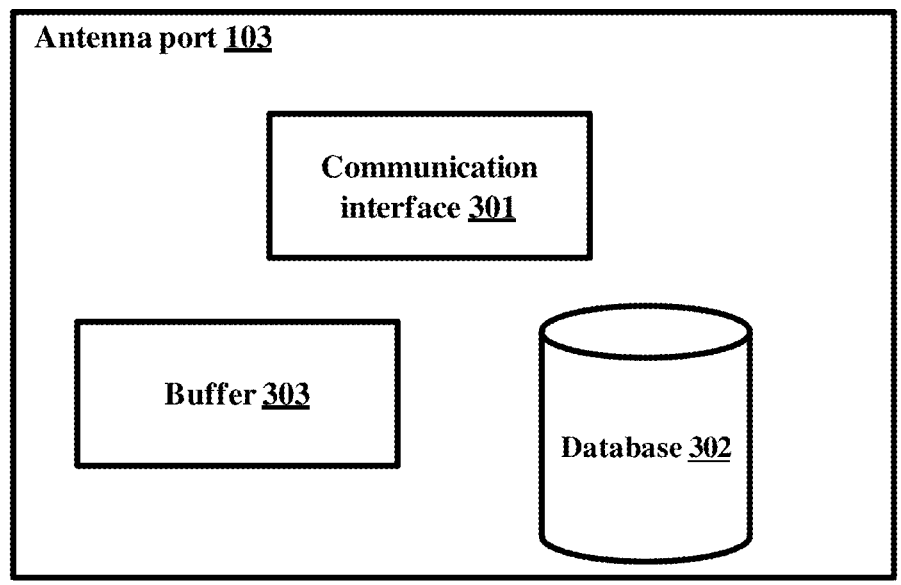
FIG. 3 depicts an antenna port, according to embodiments as disclosed herein.

FIG. 3 depicts an antenna port, according to embodiments as disclosed herein. The antenna port 103, as depicted, comprises of a communication interface 301, a database 302 and a buffer 303. The communication interface 301 acts as the interface for communication between a user and the remote base station 102. The communication interface 301 may also communicate to the user information comprising of entry and exit point related to the user and so on. The communication interface 301 may use the control channel for communicating with the user. The communication interface 301 may use data or reference signals for communication. The reference signals comprises a channel quality reference signal (which may be at pre-defined time/frequency resource elements and may be used for channel quality measurements (where channel quality is measured as post-processing Signal to Interference Noise Ratio (SINR) of receiver used by a user)) or a demodulation reference signal (which may be used for demodulation and/or CQI). The communication interface 301 may also request users connected to the antenna port 103 to provide CQI at pre-defined periodic intervals or on request. The communication interface 301 may request users connected to the antenna port 103 to provide CQI between entry and exit points to the remote BS at pre-defined periodic intervals or on request.

The database 302 may be used to store information such as the BS ID assigned to the group of antenna ports to which the antenna port belongs, the unique identification number assigned to the antenna port 103 and so on.

The embodiments above disclose an exemplary implementation of an antenna port 103 and is not restricted to the embodiments disclosed above and may comprise of blocks not depicted in FIG. 3 and all the blocks as depicted in FIG. 3 need not be present within an antenna port.

Figure 4:
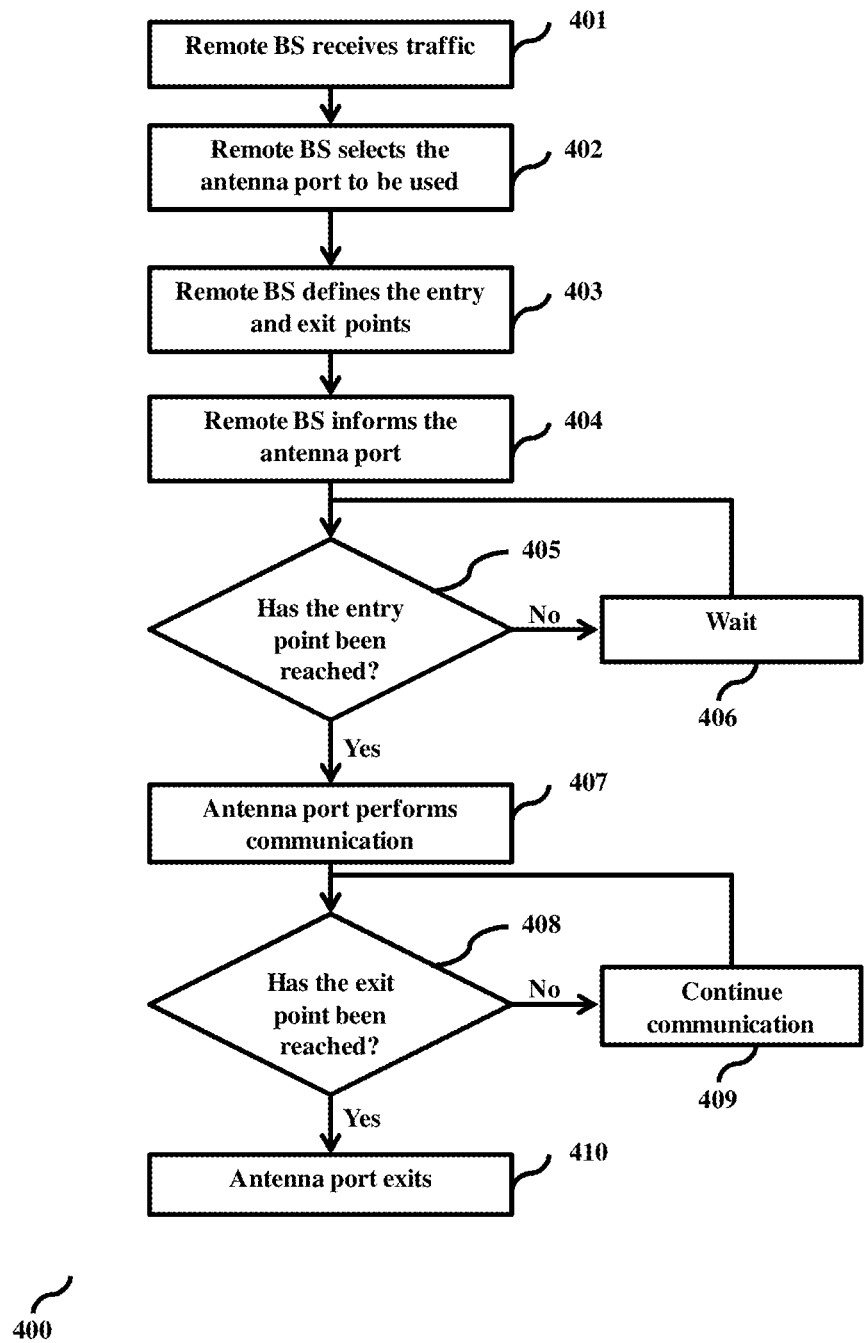
FIG. 4 is a flowchart depicting the process of managing a communication network, according to embodiments as disclosed herein.

FIG. 4 is a flowchart depicting the process of managing a communication network, according to embodiments as disclosed herein. The remote BS 102 on receiving (401) traffic destined for a user, selects (402) the antenna port 103 to be used. The remote BS 102 may select the antenna port 103 based on a plurality of factors comprising of but not restricted to options set by the destination user, channel conditions, traffic conditions, location of the destination user and so on. Further, the remote BS 102 defines (403) the entry and exit points. The entry and exit points may be defined in terms of frequency (RBGS/sub-band) and/or time (frame/sub-frame) resource units. The remote BS 102 informs (404) the same to the antenna port 103. On the antenna port 103 detecting (405) that the entry point has been reached, the antenna port 103 and the remote BS 102 communicate (407) with each other. The communication may comprise of data and/or reference signals. There will be communication at all units (RBGS/sub-band/frame/sub-frame) assigned to the antenna port 103. If no data is present, then pilot signals (such as channel quality pilots) may be transmitted. On reaching (408) the exit point, the antenna port 103 exits (410). The various actions in method 400 may be performed in the order presented, in a different order or simultaneously. Further, in some embodiments, some actions listed in FIG. 4 may be omitted.

Figure 5:
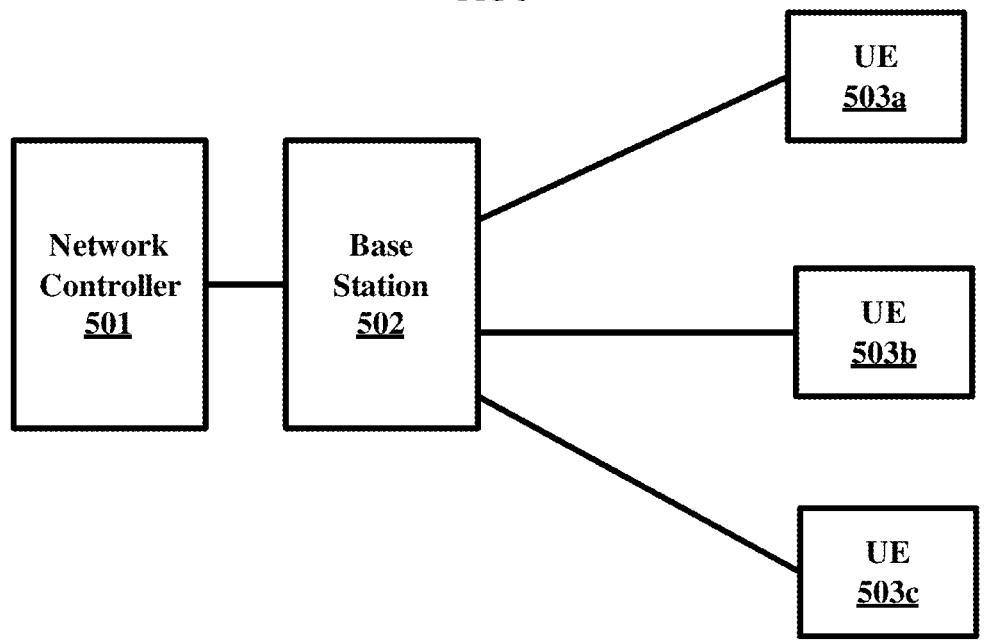
FIG. 5 depicts a communication network, according to embodiments as disclosed herein.

FIG. 5 depicts a communication network, according to embodiments disclosed herein. The communication network as depicted in FIG. 5 comprises of a network controller 501, a Base station (BS) 502 and a plurality of User Equipments (UEs) 503a, 503b and 503c. The network controller 501 controls the functioning of the BS 502 and may be connected to more than one BS 502. The controller 501 may be further connected to other equipment necessary for the functioning of the network. The BS 502 is connected to the controller 501 and to the plurality of UEs 503. The BS 502 comprises means for enabling the UE 503 to communicate with other UEs or devices.

Figure 6:
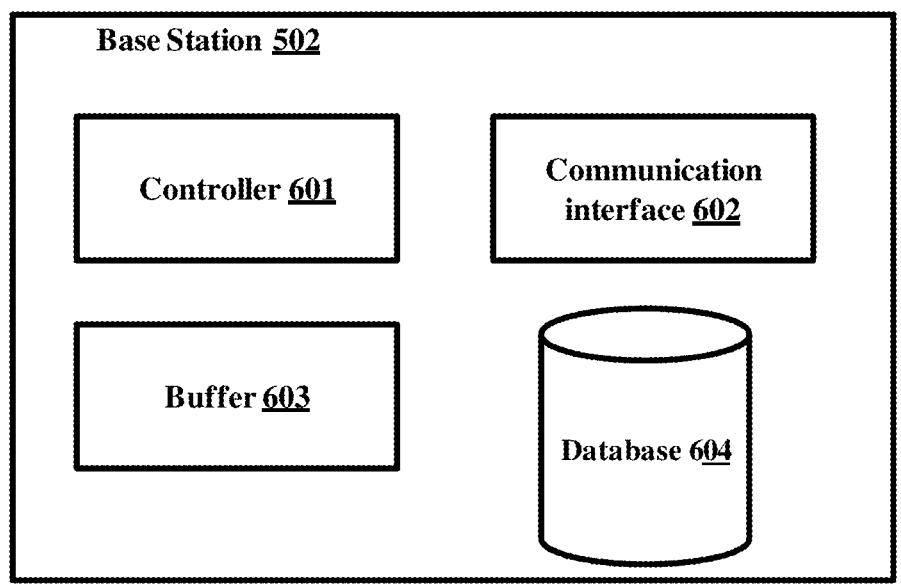
FIG. 6 depicts a network controller, according to embodiments as disclosed herein.

FIG. 6 depicts a network controller, according to embodiments as disclosed herein. The network controller 501 comprises of a controller 601, a communication interface 602, a buffer 603 and a database 604. The controller 601 is connected to at least one BS 502 via the communication interface 602 using a suitable communication means (which may be wired or wireless means). The controller 601 defines a fixed set of entry and exit points for communication for base station 502. The controller 601 may define the entry and exit points in terms of frequency (RBGS/sub-band) and/or time (frame/sub-frame) resource units, where the RBGS/sub-band/frame/sub-frame may be contiguous or distributed. The entry and exit points may be mutually exclusive among different BSs. The controller 601 sends the communication related information to the BS 502 via the communication interface 602.

The base station 502 may use the control channel for communicating with the user. The communication interface 601 may use data or reference signals for communication. The reference signals comprises a channel quality reference signal (which may be at pre-defined time/frequency resource elements and may be used for channel quality measurements (where channel quality is measured as post-processing Signal to Interference Noise Ratio (SINR) of receiver used by a user)) or a demodulation reference signal (which may be used for demodulation and/or CQI measurement). The communication interface 601 may also request BSs to provide CQI at pre-defined periodic intervals or on request.

Figure 7:
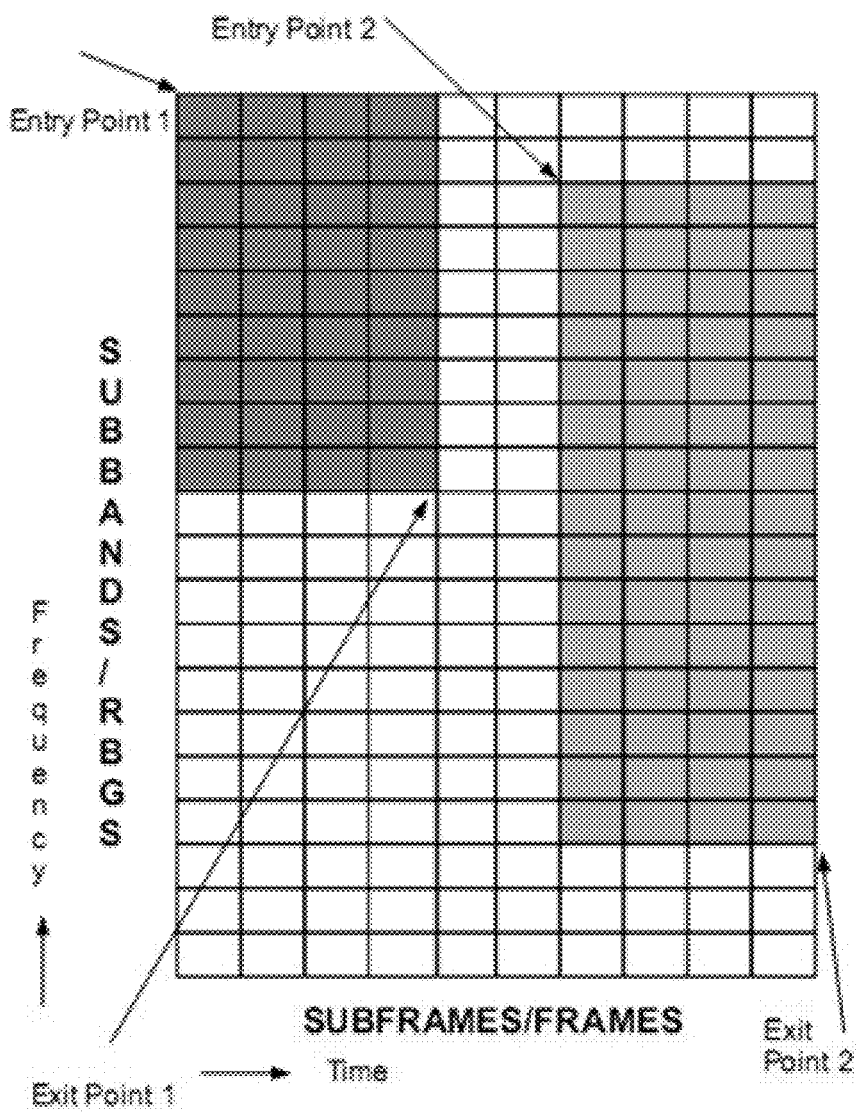
FIG. 7 depicts resource blocks with entry and exit points, according to embodiments as disclosed herein.

FIG. 7 depicts resource blocks with entry and exit points, according to embodiments as disclosed herein. The figure depicts entry and exit points for two non-contiguous blocks of sub-bands/RBGS/frames/sub-frames, as depicted by the shaded portion. The non-shaded portion is an area of normal operation.

Generalization of Single Stream Transmission Using Virtual Cells\Using Distributed Antennas Referring to FIG. 1, a single data stream is transmitted through an antenna port. An antenna port may be physically connected to either an array of antennas used to create a sectorized antenna pattern or a set of complex-weights that are applied on the antenna elements to create a virtual single antenna stream. The set of complex-weights preferably do not change in successive frames.

Remote BS 102 Controller with Remote Radio Head Ends (RRH) Using Distributed Antennas In the proposed framework, while the Remote BS 102 acts as a single BS with a given base station identification number (BS_ID), each antenna port acts as a virtual cell. Essentially, the proposed framework splits a large area covered by the Remote BS 102 in to multiple virtual cells without borders between the virtual cells. Each UE typically receives a single data stream from any one of the antenna ports requested by the UE.

Each antenna port of a Remote BS 102 carries a unique port number ranging from 0, 1, . . . , Nt−1, where Nt is the total number of antenna ports. Each antenna port shall carry a unique reference signal (RS) pattern (or pilot pattern). The RSs used on various antenna ports are designed to form RSs that are orthogonal in the time/frequency/code or some combination of the above.

In one embodiment, the remote BS 102 transmits synchronization and control information using all active antenna ports simultaneously so that all the UEs connected to the Remote BS 102 remain synchronized to all the antenna ports. In yet another embodiment, separate synchronization and control messages may be transmitted from each antenna port or a group of antennas ports. In such cases, the remote BS 102 assigns a separate BS IDs to groups of antenna ports where the antenna ports of the given group have distinct antenna port numbers.

The proposed method operates in a stable channel quality region (SCQR) with stable interference environment: The single stream MIMO mode and the RSs are coordinated among the antenna ports of the Remote BS 102 to create a stable interference environment. It is recommended to extend this type of co-ordination to other BS 102 (including macro eNB and co-channel Remote BS 102s such as pico cells) in the network. Such an implementation, offers CQI stability, which is an important requirement to achieve high capacity. The RSs are transmitted in certain designated sub frames (frames) to enable CQI measurements. Such RSs are called channel quality reference signals.

In an embodiment, the Remote BS 102 has Nt antenna ports. A single data stream is transmitted from each antenna port. A set of RSs are also transmitted from the Nt antennas ports. A Remote BS 102 using adaptive SCQR comprises of a designated set of entry exit points. The Remote BS 102 determines a set of antennas ports to be kept ON (active) at the entry point based on the traffic requirements (buffer status, QOS) of the UEs 103. If a given antenna port is made active at the entry point RSs are transmitted for the entire duration between the entry-exit points. Alternatively, the BS turns given antenna port OFF if there is no data to be transmitted for the duration of the entry-exit point. If the Remote BS 102 decides to mute (turn-off) a given antenna port both data and RS are turned OFF between the entry-exit points. Even though the BS 102 mutes a given antenna port, data transmission to UE can be maintained i.e., UEs 103 can continue to be served by the neighboring antenna ports. In yet another embodiment, the Remote BS 102 may decide to assign the same antenna port number (logical merging of antenna ports) to multiple geographically separated antennas at the entry point. The antennas with same port numbers transmit identical signals including data, RS, preamble, control between entry-exit points. The decision to merge antenna ports is made at the Remote BS 102 at the entry point based on the traffic requirements (buffer status, QOS) of the UEs or to save the energy. When antenna ports are merged, the Remote BS 102 may change the power amplifier gain of respective antennas.

In an embodiment, the RS may be precoded using the same multi-antenna precoder as that of data. CQI is computed using the precoded RSs. In another embodiment, RS is not precoded.

In an embodiment the Remote BS 102 uses demodulation reference signals (DM-RSs) specified in the LTE standard. CQI is computed using DM-RS.

In an embodiment the Remote BS 102 uses channel state information reference signals (CSI-RS) for CQI computation and DM-RSs for demodulation.

CQI Feedback

Each UE has 'Nr' receiver antennas. In an embodiment, the UE calculates a set of per-tone channel quality indicators (CQI) corresponding to each antenna port as follows:

UE assumes that the antenna port 'n' of the serving Remote BS 102 is the desired signal and all remaining antenna ports of the serving as well as non serving Remote BS 102s as co-channel interferers.

In each frame, UE measures the channel state information (CSI) and the covariance of noise-plus-interference using the signal received by the RSs. This can be done either using the DMRS or CSI-RS depending on the type of RS used by the Remote BS 102. The measurements are done using the RSs which is kept ON in certain resource units (RUs) or certain sub-frames. The UE uses an interference suppression receiver such as the minimum-mean-square-estimation (MMSE) receiver. For each tone contained in the RU of interest, the UE measures the post-processing SINR of the MMSE receiver as the per-tone CQI measurement. The per-tone CQI metrics are combined in to a single CQI for the transport unit (TU) of interest using techniques such as mean mutual information bit (MMIB) received bit information rate (RBIR), exponential effective signal to noise ratio mapping (EESM) or some other mapping technique. The CQI is quantized to a certain value so that the quantized CQI uniquely corresponds to a MCS to be used by the Remote BS 102 that provides a higher throughput (while meeting a block error rate target e.g., 10%) for a certain reference transport block length. The reference transport block length is configured by the Remote BS 102. If the resource units (RUs) span a narrow bandwidth (BW), the CQI is called Narrow band CQI or sub band CQI. The size of the sub band is configured by Remote BS 102. If the RUs span a wide BW, the CQI is called wideband CQI.

In each sub band, $M_t$ such CQI measurements are taken for each antenna port i.e., for n=0, 1, . . . , $M_{t-1}$. The UE has $M_t$ CQI measurements corresponding to Mt antenna ports where Mt is less than or equal to Nt. To determine the set of Mt antennas, the UE may utilize the information related to active set of RRHs active in that area. The active set may be broadcasted by the Remote BS 102 or the set could be determined by the UE through receiver processing.

In each sub band, the UE ranks the Nt CQI measurements in decreasing order and selects the first 'S' CQI values and the corresponding antenna port numbers. S may take values 1, 2, . . . , Nt. The minimum value of S is 1. The UE may change the value of S in a semi static manner (as per the Remote BS 102s direction).

The UE feeds back the 'S' CQI values, the corresponding antenna port numbers to the Remote BS 102 using a fast feedback channel after certain time delay. The time delay value is configured by the Remote BS 102. The UE may give feedback of the CQI values of all sub bands or a set of M-sub bands with highest CQI.

Scheduling

In an embodiment, in each data region (which is a collection of resource blocks (RBs)), the Remote BS 102 pairs 'Qt' users and transmits to the 'Qt' users simultaneously using single streams per user where Qt is less than or equal to Nt. An opportunistic scheduling algorithm such as proportional fair (PF) method can be used. The UE may receive data from any one of the antenna ports requested by the UE. In a preferred embodiment a UE 103 receives a single data steam from any one of Nt antenna ports. In another embodiment, the UE may receive multiple streams from all or a subset of different antenna ports.

Generalization of Virtual Cell Concept to Multiple Remote BSs 102

UEs 103 located the edge of the Remote BS 102 receives interference from neighbor Remote BS 102s. A technique is proposed to deal with the cell edge interference. In an embodiment of the embodiment, the Remote BS 102s transmit their preambles and control information with distinct cell IDs. The UE synchronizes with multiple dominant Remote BS 102s at the same time and moreover the UE has the ability to transmit and receive data and control from multiple Remote BS 102s at the same time. Each UE first determines the total number of dominant Remote BS 102s based on the average received power measurements. This can be done using either the received preambles or RSs of respective Remote BS 102s. The CQI reporting method and the scheduling rules can be modified as described in section 8 in the following way.

Each UE determines the best Q Remote BS 102s (where Q>0) and the Cell IDs. It feeds back this information to a serving Remote BS 102 using a feedback channel in uplink (UL). Alternatively, the UE may also communicate this information to all Q Remote BS 102s at the same time using the same feedback channel or distinct feedback channels. After receiving an instruction from the serving Remote BS 102, the UE starts reporting CQI information corresponding to all Q Remote BS 102s. More specifically, in every subband, the UE calculates the best S_n CQI values for the n-th eNB where S_n is the number of best antenna ports of the n-th Remote BS 102 (where n=1, 2, . . . , Q). The UE feeds back the S_n CQI values, the corresponding antenna port numbers for all Q Remote BS 102s. The values of S_n (n=1, 2, . . . , Q) and Q are set by the serving Remote BS 102 BS.

Each Remote BS 102 can support a maximum of Nt antenna ports. The antenna ports of an Remote BS 102 uses any one of Nt available interlaces. Also the Remote BS 102s may use orthogonal/semi orthogonal reference sequences to distinguish the antenna ports of the same or different Remote BS 102s.

Scheduling Among Multiple Remote BS 102s

A scheduler that jointly schedules users of a cluster of Remote BS 102s in the network is used. For this purpose, all Remote BS 102s exchange the scheduling information. A central scheduler collects feedback from all Remote BS 102s and uses a joint multi-user scheduling algorithm. A generalized PF scheduler can be used for this purpose. In this type of system a user may receive data simultaneously from multiple RRHs belonging to same or distinct Remote BS 102s.

Embodiments disclosed herein enable accurate computation of the interference co-variance estimation from the muted REs as there is no collision with the interfering eNBs data. Channel estimation of the desired signal improves due to muting of the interfering eNBs data. This type of design offers highly reliable CQI measurements as well as MMSE demodulation with low estimation errors.

Embodiments herein disclosing using opportunistic scheduling based on post processing SINR with multiple antenna MMSE receiver enables suppression of more than one dominant interferer compared to conventional interference suppression without opportunistic scheduling. The interference suppression gain (scheduling gain) results in a overall improved network throughput.

Frequency selectivity is important in providing fairness among users, as users can be scheduled within low latency. In low frequency selective channel, open loop precoders will create more frequency selectivity which is beneficial for opportunistic scheduling The embodiments disclosed herein can be implemented through at least one software program running on at least one hardware device and performing network management functions to control the network elements.

The embodiments above use the terms 'user' and 'user equipment (UE)' in an interchangeable manner and both terms may be understood to refer to a device used by a user of the communication network to access the network.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:
1. A communication network comprising of:
at least one network controller;
at least one remote base station connected to said at least one network controller, wherein said at least one network controller controls functioning of said at least one remote base station; and
a plurality of antenna ports connected to said at least one remote base station, wherein each antenna port comprises at least one antenna; wherein said remote base station controls functioning of said plurality of antenna ports, wherein said plurality of antenna ports are synchronized to said remote base station in at least one of time, and frequency; and wherein said at least one network controller is configured for assigning entry and exit points for each remote base station.

2. The communication network, as claimed in claim 1, wherein said antenna ports is at least one of co-located with said remote base station, and remotely located from said remote base station.

3. The communication network, as claimed in claim 1, wherein at least two antenna ports from said plurality of antenna ports are at least one of co-located with said remote base station, and remotely located from said remote base station.

4. The communication network, as claimed in claim 1, wherein said antenna ports are connected to said remote BS using one of
a wired link; and
a wireless link.

5. The communication network, as claimed in claim 1, wherein a group of antenna ports selected from said plurality of antenna ports are assigned a base station ID number, wherein said group of antenna ports comprises of at least one antenna port.

6. The communication network, as claimed in claim 5, wherein each of said plurality of antenna ports in each of said group of antenna ports is assigned a unique identification number.

7. The communication network, as claimed in claim 6, wherein said unique identification number is communicated to a User Equipment (UE) using a control message.

8. The communication network, as claimed in claim 5, wherein more than one antenna port present in said group of antenna ports is configured for transmitting identical copies of synchronization and control messages at same time.

9. The communication network, as claimed in claim 5, wherein said remote base station is configured for deciding antenna port to be used for communication based on at least one plurality of factors, said plurality of factors comprising
feedback from destination UE;
traffic conditions; and
location of said UE.

10. The communication network, as claimed in claim 5, wherein said remote base station is configured for defining entry and exit points for each selected antenna port in at least one of time, and frequency.

11. The communication network, as claimed in claim 10, wherein said remote base station is configured for defining mutually exclusive entry and exit points for said antenna ports in at least one of time, and frequency.

12. The communication network, as claimed in claim 10, wherein said remote base station is configured for defining mutually exclusive entry and exit points for said group of antenna ports in at least one of time, and frequency.

13. The communication network, as claimed in claim 10, wherein at least one antenna port from said group of antenna ports is configured for communicating said entry and exit points to at least one destination UE.

14. The communication network, as claimed in claim 10, at least one antenna port from said group of antenna ports is configured for communicating said entry and exit points to at least one destination UE using a control channel.

15. The communication network, as claimed in claim 5, wherein communication through said plurality of antenna ports comprises of at least one of data, and reference signals.

16. The communication network, as claimed in claim 15, wherein said reference signal comprises of at least one of a channel quality reference signal, and a demodulation reference signal.

17. The communication network, as claimed in claim 16, wherein said channel quality reference signal is transmitted between entry and exit points at predefined time/frequency resource elements.

18. The communication network, as claimed in claim 17, wherein said channel quality reference signal is used for channel quality measurements by a UE.

19. The communication network, as claimed in claim 18, wherein channel quality is measured as post-processing Signal to Interference Noise Ratio of receiver used by said UE.

20. The communication network, as claimed in claim 16, wherein said demodulation reference signal is used for demodulation.

21. The communication network, as claimed in claim 16, wherein said demodulation reference signal is used for channel quality measurements.

22. The communication network, as claimed in claim 5, wherein at least one antenna port from said group of antenna ports with the base station ID number requests a UE to provide channel quality measurements for a sub-group of antenna ports.

23. The communication network, as claimed in claim 5, wherein at least one antenna port from said group of antenna ports with the base station ID number transmits a control message to a UE.

24. The communication network, as claimed in claim 5, wherein said group of antenna ports with the base station ID number requests a UE to report channel quality measurements for duration between entry and exit points.

25. The communication network, as claimed in claim 1, wherein a UE is configured for reporting channel quality measurements for a base station ID number.

26. The communication network, as claimed in claim 1, wherein a UE is configured for reporting channel quality measurements for at least one antenna port from a group of antenna ports for a specific resource block.

27. The communication network, as claimed in claim 1, wherein a UE is configured for:
determining at least one antenna port, wherein said at least one antenna port has highest channel quality compared to other antenna ports;
associating with said at least one antenna port; and
performing at least one of
reporting channel quality of a set of best resource blocks corresponding to said at least one antenna port; and
reporting wide band channel quality corresponding to said at least one antenna port.

28. The communication network, as claimed in claim 1, wherein a UE is configured for:
measuring channel quality corresponding to groups of antenna ports, wherein said groups have a distinct BS ID;
associating with a group of antenna ports based on the measured channel quality BS ID from said group of antenna ports; and
reporting channel quality corresponding to said associated group of antenna ports.

29. The communication network, as claimed in claim 1, wherein a UE is configured for:
associating with a plurality of groups of antenna ports, wherein said plurality of groups have a distinct BS ID;

reporting channel quality of a first antenna port from associated plurality of group of antenna ports; and reporting channel quality of a second antenna port from said associated group of antenna ports.

30. The communication network, as claimed in claim 1, wherein a UE is configured for:

associating with a plurality of antenna ports;

reporting channel quality of a first antenna port from said associated antenna ports; and reporting channel quality of a second antenna port from said associated antenna ports.

31. The communication network, as claimed in claim 1, wherein said communication network further comprising at least one base station connected to the at least one network controller, wherein said network controller is configured for assigning entry and exit points for each base station.

32. The communication network, as claimed in claim 31, wherein said network controller is configured for defining said entry and exit points in at least one of time, and frequency.

33. The communication network, as claimed in claim 31, wherein said network controller is configured for defining a fixed set of said entry and exit points.

34. The communication network, as claimed in claim 31, wherein said network controller is configured for defining mutually exclusive entry and exit points for active base stations in at least one of time, and frequency.

35. The communication network, as claimed in claim 31, wherein said base station is configured for communicating said entry and exit points to at least one UE.

36. The communication network, as claimed in claim 31, wherein said base station is configured for communicating said entry and exit points to at least one destination UE using a control channel.

37. The communication network, as claimed in claim 31, wherein communication through said base station comprises of at least one of data, and reference signal.

38. The communication network, as claimed in claim 37, wherein said reference signal comprises of at least one of a channel quality reference signal, and a demodulation reference signal.

39. The communication network, as claimed in claim 38, wherein said channel quality reference signal is transmitted between said entry and exit points at predefined time/frequency resource elements.

40. The communication network, as claimed in claim 38, wherein said channel quality reference signal is used for channel quality measurements, wherein channel quality is measured as post-processing Signal to Interference Noise Ratio (SINR) of receiver used by a UE.

41. The communication network, as claimed in claim 38, wherein said demodulation reference signal is used for demodulation.

42. The communication network, as claimed in claim 38, wherein said demodulation reference signal is used for channel quality measurements.

43. The communication network, as claimed in claim 31, wherein said base station is configured for requesting a UE to provide channel quality measurements between said entry and exit points.

44. A remote base station in a communication network comprising of a controller configured for controlling functioning of a plurality of antenna ports, wherein said plurality of antenna ports are connected to said remote base station, wherein each antenna port comprises at least one antenna, wherein said remote base station is configured to synchronize with said plurality of antenna ports in at least one of time, and frequency; and wherein said at least one network controller is configured for assigning entry and exit points for each remote base station.

45. The remote base station, as claimed in claim 44, wherein said remote base station is co-located with at least one of said plurality of antenna ports.

46. The remote base station, as claimed in claim 44, wherein said remote BS is connected to said plurality of antenna ports using one of:

a wired link; and a wireless link.

47. The remote base station, as claimed in claim 44, wherein said remote base station is configured for assigning a group of antenna ports selected from said plurality of antenna ports a base station ID number, wherein said group of antenna ports comprises of at least one antenna port.

48. The remote base station, as claimed in claim 47, wherein said remote base station is configured for assigning each of said plurality of antenna ports in each of said group of antenna ports a unique identification number.

49. The remote base station, as claimed in claim 44, wherein said remote base station is configured for deciding antenna port to be used for communication based on at least one plurality of factors, said plurality of factors comprising:

feedback from destination UE;

traffic conditions; and location of said UE.

50. The remote base station, as claimed in claim 44, wherein said remote base station is configured for defining entry and exit points for each selected antenna port in at least one of time, and frequency.

51. The remote base station, as claimed in claim 50, wherein said remote base station is configured for defining mutually exclusive entry and exit points for said antenna ports in at least one of time, and frequency.

52. The remote base station, as claimed in claim 51, wherein said remote base station is configured for defining mutually exclusive entry and exit points for a group of antenna ports in at least one of time, and frequency.

* * * * *